United States Patent [19]

Hoche

[11] Patent Number: 4,499,389

[45] Date of Patent: Feb. 12, 1985

[54] SELF-STARTING ELECTRIC MOTOR

[75] Inventor: Günter Hoche, Bretten, Fed. Rep. of Germany

[73] Assignee: Hermann Mellert GmbH & Co. KG, Bretten, Fed. Rep. of Germany

[21] Appl. No.: 511,174

[22] Filed: Jul. 6, 1983

[30] Foreign Application Priority Data

Jul. 7, 1982 [DE] Fed. Rep. of Germany ....... 3225435

[51] Int. Cl.³ .............................................. H02K 7/10
[52] U.S. Cl. ..................................... 310/41; 310/162; 310/49 R
[58] Field of Search .......................... 310/41, 162–165, 310/49

[56] References Cited

U.S. PATENT DOCUMENTS

| 3,277,669 | 10/1966 | Woolley | 310/41 |
| 3,307,056 | 2/1967 | Woolley | 310/41 |
| 3,416,014 | 12/1968 | Kuzara | 310/41 |
| 3,748,508 | 7/1973 | Woolley | 310/41 |

FOREIGN PATENT DOCUMENTS

| 1280046 | 7/1972 | United Kingdom . |
| 1368125 | 9/1974 | United Kingdom . |
| 1376284 | 12/1974 | United Kingdom . |
| 1429100 | 3/1976 | United Kingdom . |
| 1437376 | 5/1976 | United Kingdom . |
| 2002181 | 2/1979 | United Kingdom . |

Primary Examiner—Donovan F. Duggan

[57] ABSTRACT

A self-starting electric motor is described with a permanent magnet rotor and a means for ensuring a predetermined direction of rotation, wherein the rotor is provided with a rotationally fixed eccentric element and this eccentric element cooperates with an annular disklike blocking member, with the blocking member being guided via a part fixed to the stator in an axial plane which extends at least substantially through the rotor axis and is displaced relative to the stator poles.

Figure 4:
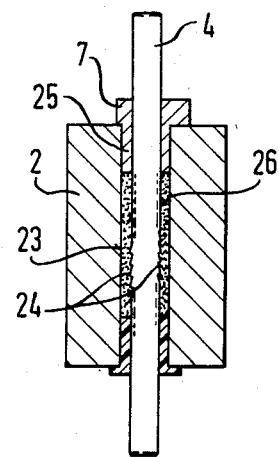

13 Claims, 4 Drawing Figures 4,499,389

SELF-STARTING ELECTRIC MOTOR

DESCRIPTION

The invention relates to a self-starting electric motor with a permanent magnet rotor and means for selecting a predetermined direction of rotation.

A self-starting single phase synchronous motor with a stator, one or two stator coils and a diametrically magnetised, permanent magnetic rotor is known from DE-AS No. 25 24 519. Such motors can be constructed so that they have a high starting torque despite a small constructional size, and can thus be used in many technical fields.

An electric can opener the drive motor of which consists of a self-starting two-pole single phase synchronous motor with a permanent magnet rotor is known from DE-PS No. 28 23 373. As a characteristic of such single phase synchronous motors is the fact that they do not start in any predetermined direction of rotation these motors are as a rule only used in situations where the direction of rotation is unimportant. As the prevailing direction of rotation of the motor determines the cutting direction a single phase synchronous motor of this kind would in fact normally not be usable. It is however provided in DE-AS No. 28 23 373 for the sheet metal cutting knife to be constructed as a pointed cutting wedge with cutting surfaces at both sides of the wedge, so that a cutting action is obtained in both directions of rotation. This emergency measure is however not satisfactory in practice.

The task underlying the present invention is to develop an electric motor of the initially named kind in such a way that a specific direction of rotation can be reliably predetermined in a manner which is extremely simple and particularly economical to realise. The electric motor of the invention should in particular be capable of being used both with a predetermined and also with a non-predetermined direction of rotation, with the conversion from one particular case to the other being capable of being realised practically without effort or expense.

This problem is solved by the invention in that the permanent magnet rotor is provided, at least in the region of one and face, with a rotationally fixed eccentric element having at least one abutment surface, the eccentric element being surrounded by a blocking member which is compulsorily guided relative to the eccentric element; in that the blocking member is guided radially via a part fixed relative to the stator in an axial plane which extends at least substantially through the rotor axis and which is displaced relative to the stator poles; and in that the asymmetrically constructed internal ring surface of the blocking member has at least one counterabutment surface for the eccentric element.

The basic thought of the invention is accordingly to be seen in the fact that a specified direction of rotation can be predetermined in a defined manner through the cooperation of an eccentric element which is fixedly connected to the rotor, and which thus becomes a component of the rotor, and a blocking member which is practically the only additional part which is necessary, and indeed without the starting up of the motor or the running of the motor being hindered in any disturbing manner.

The eccentric element preferably consists of a substantially ring-like inner part and an abutment part projecting radially therebeyond, the abutment part having a part-cylindrical outer surface and abutment surfaces symmetrically arranged relative to the center of the abutment part. The eccentric element is expediently manufactured in an impact resistant synthetic material, or of hardened material, in particular Niro steel.

The symmetrical shape of the eccentric element in cooperation with the corresponding counterabutment surfaces on the blocking member ensures the correct direction of starting from the two possible rest positions of the rotor. The choice of material for the eccentric element and also for the blocking member makes it possible to exclude disturbing wear effects and enables operation of the motor without this operation being disturbed by the means for selecting the direction of rotation.

The annular disk-like blocking member has diametrically oppositely disposed guide pins which engage in radially directed guide slots of a part fixed relative to the stator in particular of the bearing cover for the motor. Thus no additional elements are required to radially guide the blocking member which is particular advantageous with regard to the overall construction.

The inner ring surface of the blocking member preferably comprises at least two, substantially semi-circular, oppositely disposed arcs which are laterally displaced relative to one another to form the counterabutment surfaces.

This shape of the blocking member, which comprises a synthetic part, ensures a reliable function which in no way disturbs the normal operation of the motor.

As the blocking member has substantially the same axial dimension as the eccentric element and is loosely arranged between the cylindrical rotor and the bearing cover it can be selectively inserted in this intermediate space between the rotor and the bearing cover. Thus a two-pole single phase synchronous motor with permanent magnet rotor can, without any form of adjustment or fitting work, either be used as a motor which starts in any direction or, when the blocking member is inserted, as a motor which only starts up in a defined direction.

Further advantageous embodiments of the invention are given in the subordinate claims.

Figure 1:
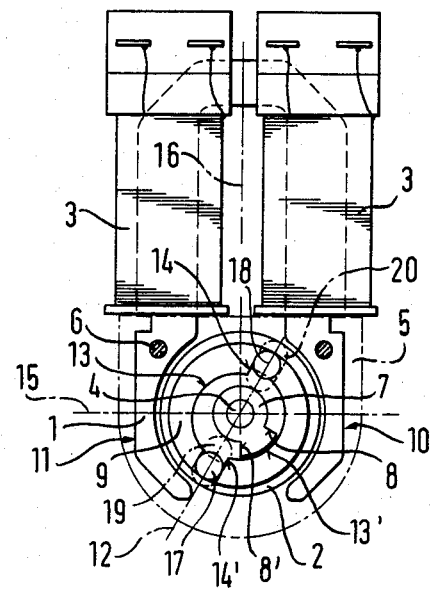
Figure 3:
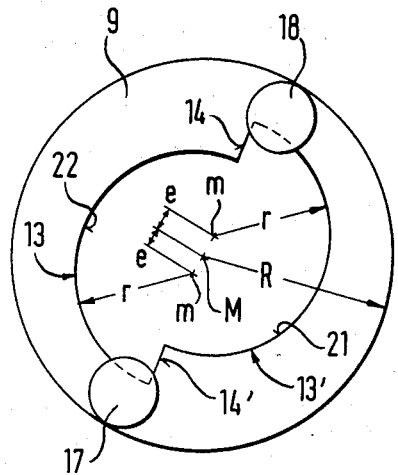
Figure 2:
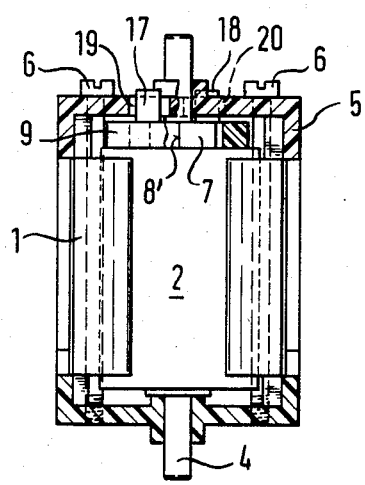

The invention will now be described in more detail by way of an embodiment and with reference to the drawings which show:

FIG. 1: a schematic end view of a motor in accordance with the invention with the bearing cover being illustrated in chain-dotted lines, FIG. 2: a partially sectioned view of the side of the motor of FIG. 1 opposite to the excitation coils, FIG. 3: a schematic illustration of an embodiment of a blocking member for use in a motor in accordance with the invention, and FIG. 4: a schematic longitudinal section of an embodiment of a rotor for use in a motor in accordance with FIG. 1.

The two-pole single phase synchronous motor illustrated in FIG. 1 includes a laminated sheet metal stator 1, a rotor 2 in the form of a cylindrical, diametrically magnetised, permanent magnet, stator coils 3 associated with the stator 1 and also—illustrated in chain-dotted lines—a bearing cover 5 which serves to support the rotor shaft 4. This bearing cover is preferably braced against the stator 1 and secured to an oppositely disposed bearing cover via through-going securing screws 6.

An eccentric element 7 is rotationally fixedly attached to the rotor shaft 4 directly adjacent the end face of the rotor. This eccentric element 7 comprises a substantially annular inner part and an abutment part which projects radially therebeyond, with the abutment part having a part-cylindrical outer surface and abutment surfaces 8, 8' lying symmetric to the center of the abutment part. The eccentric element 7 cooperates with an annular disk-like blocking member 9 which is loosely inserted between the rotor 2 and the bearing cover 5. The blocking member 9 is guided in the radial direction by means of pins 17, 18 formed thereon which engage in radial slots 19, 20 of the bearing cover 5.

The radial slots 19, 20, and thus also the guide pins 17, 18, lie in a plane which extends through the rotor shaft 4 and which is displaced relative to the central plane 16 of the motor and indeed preferably by an angle in the range from 15° to 45°.

The pole connecting plane 15 between the two stator poles, which is shown in chain-dotted lines, extends at right angles to the central plane 16 of the motor.

The blocking member 9 has internal ring surfaces 13, 13' and also counterabutment surfaces 14, 14' formed in the transition region between these mutually displaced internal ring surfaces. These counterabutment surfaces 14, 14' cooperate with the abutment surfaces 8, 8' of the eccentric element 7.

The stator 1 consists of individual metal sheets with all the metal sheets having the same shape. The pole arcs are of asymmetrical shape so that an enlarged air gap results at the oppositely disposed positions. This results in the permanent magnet rotor 2 rotating through a specific angle relative to the position which it would adopt with symmetrical stator pole arcs, until it reaches the position in which the magnetic resistance is a minimum. The pole arcs are furthermore so constructed that the stator windings 3 can be pushed thereover in the already wound condition. The two illustrated coils can be arranged either in parallel or in series and can be connected directly with a voltage source.

A characteristic of electric motors in accordance with the invention is the fact that, when stationary, the rotor 2 adopts one of two positions relative to the stator 1. These positions are displaced by 180° relative to one another and, as a result of the dimensioning, are angularly displaced relative to the pole connection plane 15. As, in practically all applications, these motors are connected to a reduction transmission which necessarily has a certain play, the rotor 2 can adopt one of these two rest positions even when the output drive shaft of the transmission is blocked in a particular position. This is a consequence of the aforementioned play in the transmission.

In the rest position of the motor the eccentric element 7 which rotates with the rotor 2 is angularly displaced relative to the axial plane 12 which extends in the direction of displacement of the blocking member 9, and also relative to the pole connection plane 15. The eccentric element 7 adopts either the position shown in FIG. 1 or a position at 180° thereto.

If the motor is switched on the rotor 2 can either move in the clockwise or counterclockwise sense, with it not being possible to predict the direction of movement which occurs. If the rotor 2 moves in the clockwise sense, i.e. in the desired direction of rotation, the blocking member 9 does not hinder the rotation of the rotor in any way, as the blocking member 9 always moves out of the way of the eccentric element and thereby executes a gentle oscillating movement in the direction of the plane 12. The abutment surfaces 8, 8' of the eccentric element and the counterabutment surfaces 14, 14' of the blocking member cannot come into engagement with this direction of rotation.

If the motor starts to run in the counterclockwise direction then, in the example shown in FIG. 1, the abutment surface 8 of the eccentric element 7 contacts the counterabutment surface 14 of the blocking member 9 so that a rotation in the counterclockwise direction is prevented. On the next reversal of the stator poles 10, 11 the rotor 2 moves in the clockwise direction and the angular momentum which is created is generally sufficient to ensure rotation in the desired direction, as a rule immediately after the first pole reversal.

As a result of the compulsory guidance between the eccentric element 7 and the blocking member 9, and as a result of the special shape of the internal ring surfaces it is ensured that the motor always starts up in a specific direction independently of any form of bias springs and also independently of the installed position of the motor.

It is also of advantage from a technical manufacturing view point that no special accuracy requirements need to be satisfied either between the eccentric element and the blocking member 9 or between the guide pins 17, 18 and the slots 19, 20; because a relatively large amount of play, which simplifies manufacture, can be left between these components and is indeed desired.

FIG. 2 shows the arrangement in the space between the rotor 2 and the bearing cover 5 of the blocking member 9 which is compulsorily guided in a radial direction via the eccentric element 7 and loosely supported in the axial direction.

The guide pins 17, 18 engage in the slots 19, 20 and thus determine the direction of movement of the blocking member 9.

It is evident that the blocking member 9 can be inserted or removed without problem because to do this it is only necessary to take off the bearing cover 5. If the blocking member 9 is removed the motor operates as a customary single phase synchronous motor with non-specified direction of rotation.

If, accordingly, the basic construction of the motor is made such that the rotor is provided with the eccentric element, and if an adequate space for the blocking member 9 is provided between the rotor and the rotor cover, then the motor can be used without a blocking member to drive apparatus where the direction of rotation is unimportant, and, after insertion of the blocking member, can be converted to a motor which reliably only starts up in one desired direction of rotation, as is for example required for a can opener.

The schematic illustration of FIG. 3 shows a preferably used embodiment of a blocking member 9.

The annular disk-like blocking member 9, which preferably consists of synthetic material, has an internal ring surface which consists of two semi-circular oppositely disposed arcs 21, 22 with a radius r which are laterally displaced relative to one another to form the counter abutment surfaces 14, 14'. The center point M of the annular disk-like blocking member 9 with the radius R and the center points m of the two semi-circular arcs 21, 22 lie in one plane. The distance e of the two center points m of the semi-circular arcs 21, 22 from the center point M of the blocking member 9 is substantially the same as the radial extent of the counterabutment surfaces 14, 14'.

The diametrically oppositely disposed guide pins 17, 18 lie at least substantially in the same plane as the counterabutment surfaces 14, 14'.

The described form of the blocking member 9, in cooperation with the eccentric element 7, results in particularly favourable conditions of movement which prevent the occurrence of disturbing wear.

The longitudinal section view of FIG. 4 shows the cylindrical rotor 2 which has a central through-opening 23 which is preferably of square cross-section. The rotor shaft 4 extends through this opening 23 and is centrally secured therein by the injection of a synthetic material 26 which hardens. The shaft 4 is preferably provided with chamfers 24 in order to obtain a particularly good bond between the synthetic material 26 and the shaft.

The process of injecting the synthetic material for the purpose of securing the shaft can be simultaneously exploited to shape the eccentric element 7 by the use of a suitable mold. This results in a significant technical manufacturing advantage.

The eccentric element can however also consist of a separate component with a formation 25 which engages in the rectangular opening 23 of the rotor 2 and is fixed therein. The formation 25 can be at least substantially be matched to the shape of the throughopening in order to ensure a reliable force transmitting connection.

Although the described electric motor of the invention can be used, with a variety of pieces of apparatus in which a powerful but nevertheless small motor is required, as a result of the advantageous means for ensuring a predetermined direction of rotation, a preferred application lies in the use of the electric motor in an electric can opener as the special characteristics of a motor of this kind are particularly advantageous in this application.

I claim:

1. A self-starting synchronous electric motor comprising: a permanent magnet rotor having an axis of rotation, first and second end faces and a side surface; a stator having pole pieces disposed adjacent said side surface and spaced therefrom by an air gap; stator windings energisable by an AC current; a stationary part spaced from and facing said first end face of said rotor; an eccentric element mounted adjacent said first end face for rotation with said rotor, said eccentric element comprising an inner part and a single abutment part which projects radially outwardly from said inner part and has a part-cylindrical outer surface with a radius of curvature and an abutment surface extending generally radially between said part-cylindrical outer surface and said inner part; a blocking member having a profiled aperture surrounding said eccentric element and cooperating therewith to determine the direction of rotation of said rotor about said axis, said blocking member being disposed between said stationary part and said first end face; first and second guide pins on said blocking member for guiding said blocking member for linear oscillatory movement in an axial plane which includes said axis of rotation, said guide pins being disposed in said axial plane on diametrically opposite sides of said axis of rotation and being directed parallel to said axis of rotation; and first and second elongate slot guides in said stationary part for receiving said first and second guide pins respectively, said first and second elongate slot guides extending radially of said axis of rotation on opposite sides thereof along respective radii which lie in said axial plane; and wherein said profiled aperture is bounded by two semi-circular arcs, which are displaced relative to one another and have respective ends, and by two substantially radially directed counterabutment surfaces which respectively extend between adjacent ends of said semi-circular arcs; whereby, on rotation of said rotor in one direction, said abutment surface strikes one of said counterabutment surfaces, thus preventing further rotation of said rotor in said direction, and whereby, on rotation of said rotor in an opposite direction, said eccentric element produces said linear oscillatory movement of said blocking member and said blocking member does not block further rotation of said rotor.

2. An electric motor in accordance with claim 1 wherein a second abutment surface extends generally radially between said part-cylindrical outer surface and said inner part at an opposite end of said part-cylindrical outer surface from the first said abutment surface.

3. An electric motor in accordance with claim 1 wherein said eccentric element comprises a hardened material.

4. An electric motor in accordance with claim 1, wherein said eccentric element comprises an impact resistant synthetic material.

5. An electric motor in accordance with claim 1, wherein said stator consists of sheet metal laminations of the same section defining first and second asymmetrically shaped pole arcs each having a respective midpoint; wherein a notional pole connection plane extends through said axis of rotation and through the midpoints of each of said first and second pole arcs; and wherein said eccentric element is displaced relative to said pole connection plane by at least substantially the same angle as that through which said rotor is displaced in its stationary position when said stator windings are not energised relative to the stationary position that it would adopt with symmetrical stator pole arcs.

6. An electric motor in accordance with claim 1, wherein said stationary part is formed by a bearing cover of the motor.

7. An electric motor in accordance with claim 1, wherein said motor has a central plane containing said axis of rotation and first and second stator poles symmetrically disposed on either side of said central plane, wherein said axial plane forms an angle with said central plane in the range from 25° to 50°.

8. An electric motor in accordance with claim 7 wherein said axial plane forms an angle with said central plane in the range from 30° to 40°.

9. An electric motor in accordance with claim 1, wherein said counterabutment surfaces lie at least substantially in said axial plane.

10. An electric motor in accordance with claim 1, wherein said blocking member has a center point, wherein said semi-circular arcs have respective centers of curvature, wherein said centers of curvature and said center point lie substantially in one plane; and wherein the distances of said centers of curvature of the semi-circular arcs from said center point are at least substantially the same as the radial extent of said counterabutment surfaces.

11. An electric motor in accordance with claim 1, wherein said blocking member comprises a synthetic part.

12. An electric motor in accordance with claim 1, wherein said rotor has a through-opening which is of polygonal cross-section and a rotor shaft accommodated in said through-opening, and wherein said rotor shaft is secured in the through-opening by injection-molded synthetic material which simultaneously serves to form said eccentric element.

13. An electric motor in accordance with claim 1, wherein said rotor has a rectangular opening and wherein said inner part of said eccentric element includes a formation which engages in said rectangular opening of said rotor and is fixed therein.

* * * * *